United States Patent
Danilov et al.

(10) Patent No.: US 11,743,193 B2
(45) Date of Patent: Aug. 29, 2023

(54) SLIDING WINDOW PROTOCOL FOR COMMUNICATION AMONG MORE THAN TWO PARTICIPANTS

(71) Applicant: Seagate Technology LLC, Fremont, CA (US)

(72) Inventors: Nikita Danilov, Moscow (RU); Mandar Satish Sawant, Longmont, CO (US); Hua Huang, Beijing (CN)

(73) Assignee: Seagate Technology LLC, Fremont, CA (US)

( * ) Notice: Subject to any disclaimer, the term of this patent is extended or adjusted under 35 U.S.C. 154(b) by 19 days.

(21) Appl. No.: 17/515,989

(22) Filed: Nov. 1, 2021

(65) Prior Publication Data
US 2023/0138477 A1    May 4, 2023

(51) Int. Cl.
*H04L 47/22*    (2022.01)
*H04W 28/02*    (2009.01)
*H04L 47/27*    (2022.01)

(52) U.S. Cl.
CPC ............ *H04L 47/225* (2013.01); *H04L 47/27* (2013.01); *H04W 28/0289* (2013.01)

(58) Field of Classification Search
CPC ... H04L 47/225; H04L 47/27; H04W 28/0289
See application file for complete search history.

(56) References Cited

U.S. PATENT DOCUMENTS

| | | | |
|---|---|---|---|
| 6,697,983 B1 * | 2/2004 | Chintada | ............... H04W 28/06 714/748 |
| 8,072,898 B2 | 12/2011 | Viger et al. | |
| 8,169,911 B2 | 5/2012 | Viger et al. | |
| 8,274,996 B1 * | 9/2012 | Yuan | ...................... H04L 1/1887 370/473 |
| 8,320,252 B2 | 11/2012 | Derom et al. | |
| 8,605,590 B2 | 12/2013 | Sivakumar et al. | |
| 9,288,263 B2 | 3/2016 | Rajapakse | |
| 10,650,812 B2 | 5/2020 | Kothuvatiparambil et al. | |
| 10,755,209 B2 | 8/2020 | Ramachandran | |

(Continued)

FOREIGN PATENT DOCUMENTS

| CN | 102082649 B | 6/2014 |
|---|---|---|
| EP | 1771998 B1 | 4/2015 |

(Continued)

OTHER PUBLICATIONS

Dmitri Chkliaev et al., "Verification and Improvement of the Sliding Window Protocol", pp. 113-127, dated 2003, 15 pages.

*Primary Examiner* — Khaled M Kassim
*Assistant Examiner* — Najeeb Ansari
(74) *Attorney, Agent, or Firm* — Westman, Champlin & Koehler, P.A.

(57) ABSTRACT

A system includes multiple nodes that communicate among one another. Each of the multiple nodes includes at least one data storage container. The system also includes a sender sliding window (SSW) that controls sending of data from at least one node of the multiple nodes to at least one other node of the multiple nodes. The system further includes a receiver sliding window (RSW) that controls receiving of the data from the at least one node of the multiple nodes at the at least one other node of the multiple nodes. At least one of the SSW or the RSW is sharable amongst more than one node of the multiple nodes.

15 Claims, 4 Drawing Sheets

(56) References Cited

U.S. PATENT DOCUMENTS

| | | | |
|---|---|---|---|
| 10,944,697 B2 | 3/2021 | Walton et al. | |
| 2003/0081664 A1* | 5/2003 | Lu | H04L 49/90 |
| | | | 375/259 |
| 2009/0316719 A1 | 12/2009 | Baron et al. | |
| 2010/0008245 A1 | 1/2010 | Viger et al. | |
| 2011/0103403 A1 | 5/2011 | Derom et al. | |
| 2017/0373915 A1* | 12/2017 | Zhang | H04L 69/163 |
| 2022/0124865 A1* | 4/2022 | Kanamarlapudi | |
| | | | H04W 56/0015 |

FOREIGN PATENT DOCUMENTS

| | | |
|---|---|---|
| FR | 2929789 A1 | 10/2009 |
| JP | 5005003 B2 | 8/2012 |

* cited by examiner

SLIDING WINDOW PROTOCOL FOR COMMUNICATION AMONG MORE THAN TWO PARTICIPANTS

SUMMARY

In one embodiment, a method of controlling communication among a plurality of nodes in a network is provided. The method includes establishing a sender sliding window (SSW) to control sending of data from at least one node of the plurality of nodes to at least one other node of the plurality of nodes. The method also includes establishing a receiver sliding window (RSW) to control receiving of the data from the at least one node of the plurality of nodes at the at least one other node of the plurality of nodes. At least one of the SSW or the RSW is sharable among more than one node of the plurality of nodes.

In another embodiment, a system is provided. The system includes a plurality of nodes configured to communicate among one another. Each of the plurality of nodes includes at least one data storage container. The system also includes a SSW configured to control sending of data from at least one node of the plurality of nodes to at least one other node of the plurality of nodes. The system further includes a RSW configured to control receiving of the data from the at least one node of the plurality of nodes at the at least one other node of the plurality of nodes. At least one of the SSW or the RSW is sharable amongst more than one node of the plurality of nodes.

In yet another embodiment, a non-transitory computer-readable storage medium includes instructions that cause a system to establish a SSW to control sending of data from at least one node of a plurality of nodes of the system to at least one other node of the plurality of nodes. The non-transitory computer-readable storage medium also includes instructions that cause the system to establish a RSW to control receiving of the data from the at least one node of the plurality of nodes at the at least one other node of the plurality of nodes. At least one of the SSW or the RSW is sharable among more than one node of the plurality of nodes.

This summary is not intended to describe each disclosed embodiment or every implementation of the sliding window protocol for communication among more than two participants as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the disclosure relate to a sliding window protocol for communication among more than two participants.

Typically, sliding window protocols are employed for communication between two participants (e.g., two computers) in order to prevent overflow of the respective participant's buffers. Transmission Control Protocol (TCP) is one example of a protocol that utilizes sliding windows for data flow control between two participants.

In contrast with the sliding window protocols for communication between two participants, embodiments of the disclosure employ a sliding window protocol that includes a distributed parallel process that can run on more than two nodes or participants, and in which a same sliding window may be shared by, for example, multiple sending nodes that communicate with a receiving node. Prior to providing details regarding the different embodiments, a description of an illustrative operating environment is provided below.

Figure 1:
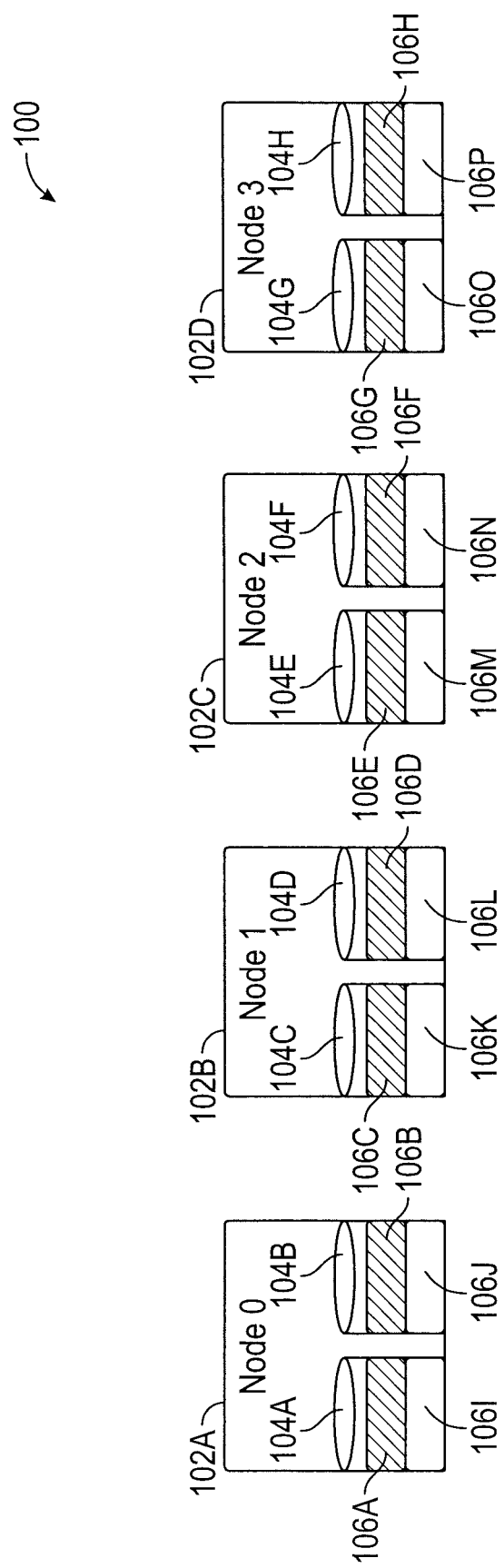
FIG. 1 is a diagrammatic illustration of a computer network in which at least some of the embodiments of the disclosure may be practiced.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that like reference numerals may be used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a diagrammatic illustration of a computer network or system 100 in which at least some of the embodiments of the disclosure may be practiced. Computer network 100 includes multiple nodes 102 that are capable of communicating with one another using wired or wireless communication. Four nodes 102A-102D (also referred to as nodes 0-3) are shown as an example. However, any suitable number of nodes 102 may be employed in different embodiments. Each node 102 may be a computing device that includes processing circuitry (not shown), communication circuitry (not shown) and data containers 104. Data containers 104 may each include one or more data storage devices such as hard disc drives (HDDs), solid state drives (SSDs), and hybrid drives, which combine features of HDDs and SSDs in one unit. As just one example, two data containers 104 are shown per node 102, thereby providing a total of 8 data containers denoted by 104A-10H. Data sets may be distributed in multiple packets across the 8 containers 104. The data packets are denoted by 106A-106P.

As depicted in FIG. 1, the data sets 106 may be distributed across multiple nodes 102A-102D (or 0-3). There are several situations that may lead to data transfers between the nodes 0-3 in such a distributed setup, e.g., Storage capacity balancing for better scalability, performance and storage consumption Handling storage device failures and recovering from the failures Backup, etc.

Data transfer processes in a distributed setup of the type shown in FIG. 1 involve various resources such as network, memory and central processing unit (CPU). Typically, the containers 104 are parts of multiple groups (e.g., each container 104 may store data belonging to different data sets with, for example, each different data set having data from a different redundant array of inexpensive disks (RAID) stripe). An expansive recovery operation across multiple groups may easily exhaust system resources (e.g., CPU, memory and network bandwidth) and effectively block regular input/output (I/O) operations, thereby leading to starvation of other tasks. Allocating resources and controlling such a recovery operation is a challenge. Embodiments of the disclosure provide a sliding window protocol that allows expansive data transfers (e.g., data transfers in the case of recovery operations) to:

Utilize system resources such that there is no or minimal effect on regular operations such as I/O.

Provide a mechanism to report progress of distributed operations.

Handle failures and allow continuation of the distributed operation(s).

In embodiments of the disclosure, the sliding window protocol is configured to maintain two versions of a sliding window (e.g., a sender sliding window (SSW) and a receiver sliding window (RSW)). A sender is a node 102 that sends its contribution of the distributed data to another node 102, while a receiver is a node 102 that receives data from one or more sender nodes 102. A SSW is mainly used to improve communication during failure cases. Data transfer operations are mainly dictated by the RSW, which is controlled by the receiver nodes depending on their receiving bandwidth ($R_b$).

Figure 2:
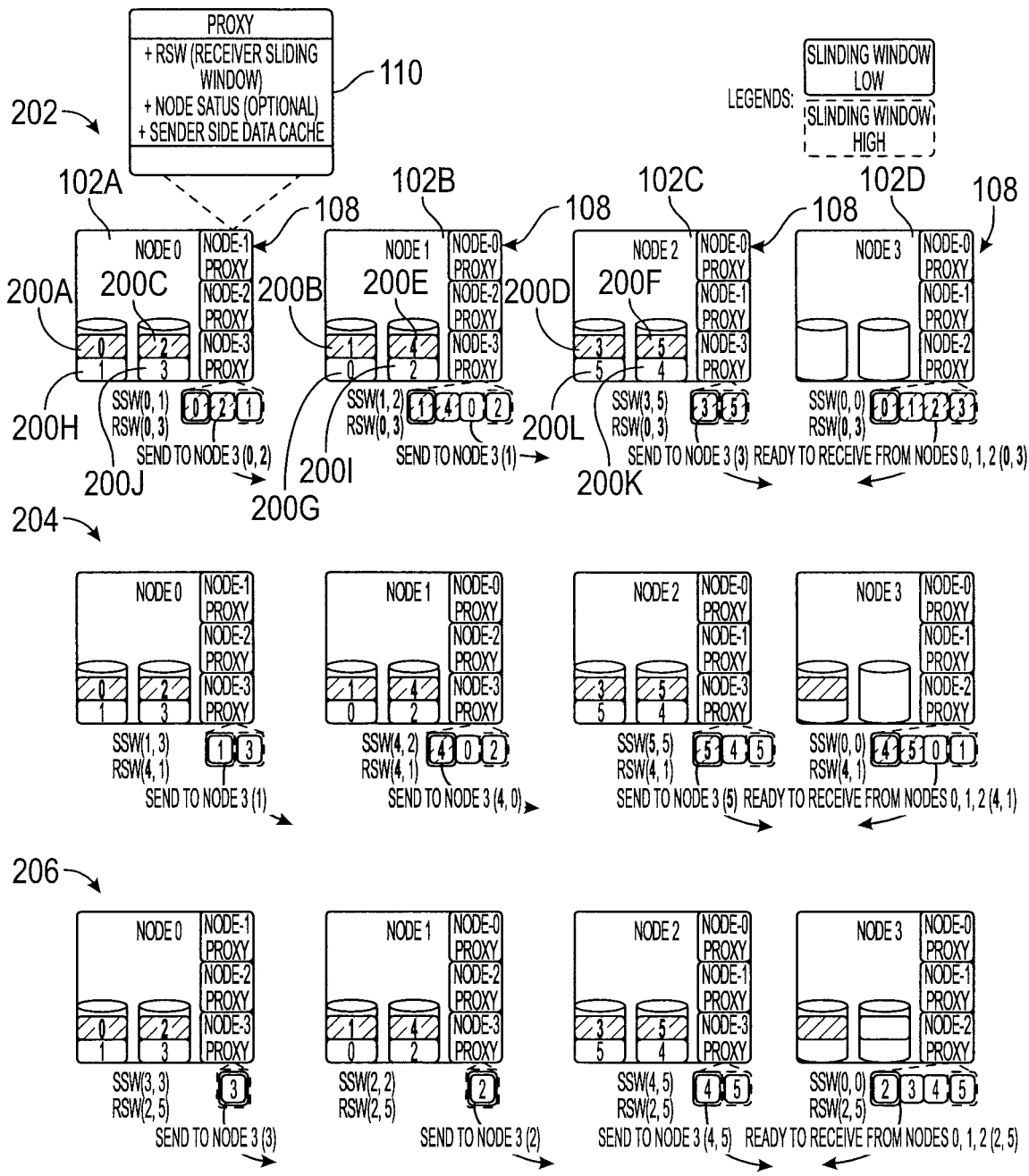
FIG. 2 is a block diagram illustrating data transfer operations using a sender sliding window and a receiver sliding window in accordance with one embodiment.

FIG. 2 is a block diagram illustrating data transfer operations using a SSW and a RSW in accordance with one embodiment. In FIG. 2, for simplicity, node 102D (or node 3) is depicted as an only receiver of data packers from its peer nodes 102A-102C (or nodes 0-2). As in a typical distributed store, data is divided into multiple packets 200A-200L and striped across multiple nodes 102 (in this example, nodes 102A-102C). In the example of FIG. 2, data packets 200A-200F belong to a first data set or group, and are shown as shaded boxes. Data packets 200A-200F are also referred to herein as data packets 0-5 of the first group and are in bold. Data packets 200G-200L belong to a second data set or group, and are shown as unshaded boxes in FIG. 2. Data packets 200G-200L are also referred to herein as data packets 0-5 of the second group and are not in bold.

In some embodiments, every node 102 may maintain a proxy data structure 108 (sometimes simply referred to herein as proxy) corresponding to every other node 102. The proxy data structure 108 may be used to maintain the SSW and RSW information, and for additional purposes (e.g., for data caching). Data associated with the proxy 108 may be stored in any suitable memory within node 102. In a particular example 110, proxy data structure 108 may be utilized to maintain a RSW, a node status (e.g., a status indicative of whether different nodes 102 are active or inactive (e.g., due to failure)), and a sender side data cache.

Figure 4:
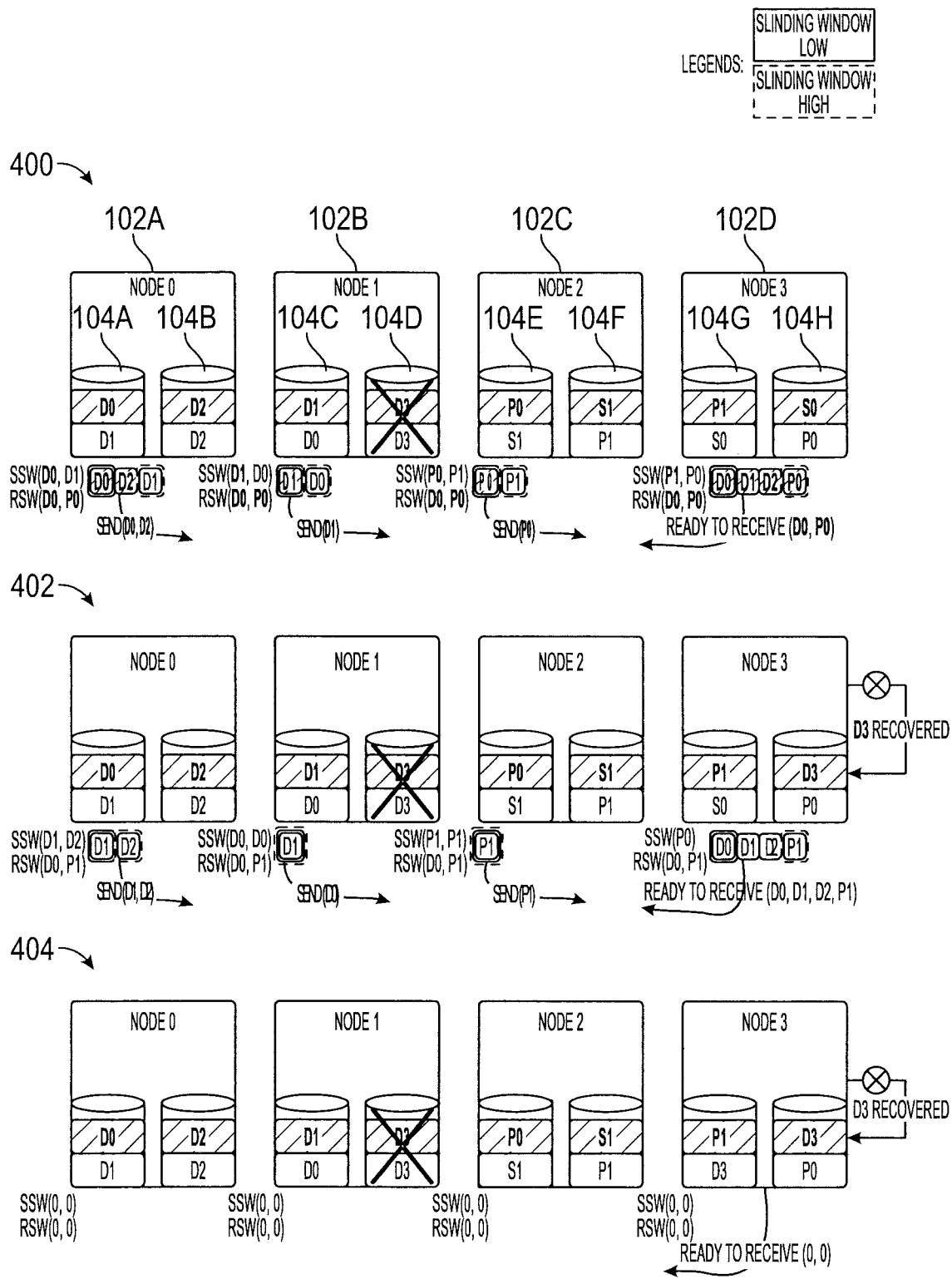
FIG. 4 is a block diagram illustrating a distributed data recovery operation using a sliding window protocol in accordance with an embodiment of the disclosure.

In one embodiment, each node 102, a sender or receiver, maintains location and size information for its stored packets 200 belonging to its respective data sets or groups. Additionally, as indicated above, each node 102 maintains proxy 108 representing its peer (sender or receiver) that caches the RSW and the SSW. The cached RSW and SSW information may include low (lo) and high (hi) identifiers for a string of data packets in a particular data set or group to be transferred using the respective RSW and SSW. Such information is generally represented by $RSW_{(lo, hi)}$ and $SSW_{(lo, hi)}$ in the disclosure, and examples using specific lo and hi packet identifiers are provided in FIGS. 2 and 4, and described further below. In the examples of FIGS. 2 and 4, a lo packet is identified by a solid box surrounding the data packet, and a hi packet is identified by a dashed box surrounding the data packet. It should be noted that that the lo and hi packets may be from a same date set or from different data sets. The lo and hi packets may be viewed as beginning and ending edges, respectively, of the RSW/SSW.

In embodiments of the disclosure, the sender node 102 (e.g., node 102A, 102B or 102C) caches its contribution to the SSW and does not add it to the RSW until the receiver node 102 (e.g., node 102D) communicates to the sender node 102 (e.g., node 102A, 102B or 102C) that it has the available bandwidth to receive the cached data contribution. This avoids blocking the sender node 102 (e.g., node 102A, 102B or 102C) until the receiver node 102 (e.g., node 102D) is ready to receive data.

In some embodiments, the receiver node (e.g., 102D or node-3 in FIG. 2) calculates its receiving bandwidth $R_b$, which is a product of incoming data packets/units and a size of each data packet/unit. In the example of FIG. 2, $R_b$ is the total expected incoming data packets/units from the peer nodes (e.g., nodes 0-2) multiplied by the size of each data packet/unit, which gives a total size of the expected data for node 3. The receiver (e.g., node-3 in FIG. 2) also calculates the available bandwidth $A_b$, which is a function of $C_b$, $M_b$, and $N_b$, where $C_b$, $M_b$, $N_b$ are CPU, memory and network bandwidths, respectively.

Upon calculating the receiver and available bandwidth, the receiver node 102D may choose between receiving a subset of or all of the data units expected. This is carried out by the receiver node 102D broadcasting its available bandwidth to all the relevant members (e.g., all of nodes 102A-102C) or just to a subset of them (e.g., one or two of nodes 102A-102C). Then, the sender node(s) send their respective blocks/packets of data with the help of the RSW.

FIG. 2 shows 3 example stages (first stage 202, second stage 204 and third stage 206) of data communication among nodes 102 using the sliding window protocol of the disclosure. The separation of the inter-node communication into 3 different stages is merely for purposes of illustration. In general, inter-node communication can take place in any suitable manner without any limitation as to how, when, and in what order/number the data packets 200A-200L are transferred among nodes 0-3.

In the first stage 202, receiver node 3 is ready to receive data packets 0-3 of the first group, and communicates its readiness to the different sender nodes 0-2. Data packets 0-3 of the first group, which node 3 is ready to receive, are stored in different ones of sender nodes 0-2, with sender node 0 having packets 0 and 2, sender node 1 having packet 1, and sender node 2 having packet 3. Since all of sender nodes 0-2 have data to send to receiver node 3, in first stage 202, $RSW_{(lo, hi)}$ cached by each of sender nodes 0-2 in their respective Node-3 proxies in 108 is $RSW_{(0, 3)}$.

As can be seen in first stage 202 of FIG. 2, sender node 0 is ready to send data packets 0 and 2 of the first group, and is also ready to send data packet 1 of the second group. Thus, $SSW_{(lo, hi)}$ cached by sender node 0 is $SSW_{(0, 1)}$, where the lo identifier 0 is for the first data packet of the first data set, and high identifier 1 is for the second data packet of the second data set. Since the receiver node 3 is not ready to receive any data packets belonging to the second group, node 0 sends its stored data packets 0 and 2 belonging to the first group to receiver node 3, and does not send data packet 1 of the second group.

In first stage 202, sender node 1 is ready to send data packets 1 and 4 of the first group and data packets 0 and 2 of the second group. Since the receiver node 3 is not ready to receive any data packets belong to the second group, node 1 sends its stored data packet 1 belonging to the first group to receiver node 3, and does not send data packet 4 of the first group and data packets 0 and 2 of the second group.

Further, in first stage 202, sender node 2 is ready to send data packets 3 and 5 of the first group. Since the receiver node 3 is not ready to receive data packet 5 of the first group, node 2 sends its stored data packet 3 belonging to the first group to receiver node 3, and does not send data packet 5 of the first group.

In second stage 204, node 3 has received all the data packets (packets 0-3 of the first group) that it requested in stage 202, and is now ready to receive remaining data packets 4 and 5 of the first group, and data packets 0 and 1 of the second group. As can be seen in FIG. 2, communication using SSWs and RSWs to accomplish data transfers in the second stage 204 takes place in a manner similar to that described above in connection with the first stage 202. Therefore, in the interest of brevity, data communication details are omitted.

In third stage 206, node 3 has received all the data packets (packets 4 and 5 of the first group, and packets 0 and 1 of the second group) that it requested in stage 204, and is now ready to receive remaining data packets 2-5 of the second group. Since the transfer of data packets in third stage 206 is shown at the bottom of FIG. 2, and takes place in a manner to that described above, no additional details are provided.

The above-described sliding window protocol may be utilized in various distributed operations involving data transfers between the nodes. One such distributed operation is a data recovery operation. An example of a data recovery operation for which the sliding window protocol may be utilized is described below in connection with FIGS. 3 and 4.

Figure 3:
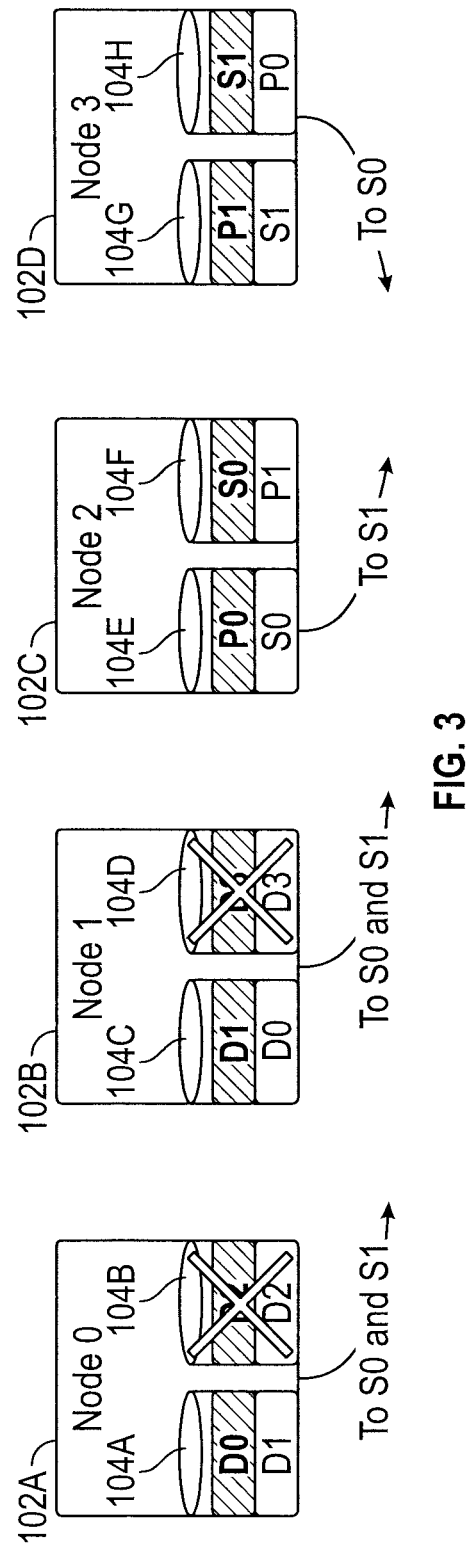
FIG. 3 is a block diagram illustrating a data recovery operation in a 4-node system having 2 data containers in each node.

FIG. 3 is a block diagram illustrating a data recovery operation in a 4-node system having 2 data containers in each node. In FIG. 3, $D_0$-$D_3$ are data packets, $P_0$ and $P_1$ are parities calculated over the data blocks $D_0$ and $D_3$, and $S_0$ and $S_1$ are spare units. Failed data is recovered in containers holding the spare units $S_0$ and $S_1$ (e.g., containers 104F, 104H). $D_0$-$D_3$, $P_0$, $P_1$, $S_0$ and $S_1$ that belong to a first data set or group are shown as shaded boxes, and $D_0$-$D_3$, $P_0$, $P_1$, $S_0$ and $S_1$ that belong to a second data set or group are shown as unshaded boxes. In the example shown in FIG. 3, both node 0 and node 1 have 1 container failure (depicted as an X in FIG. 3). Lost data units $D_2$ and $D_3$ from each data set or group in containers 104B and 104D may be recovered in spare units $S_0$ and $S_1$ on nodes 2 and 3, respectively.

A group's data and parity members distributed across multiple containers and nodes are related by a set of linear equations:

$$a_{00}*D_0+a_{01}*D_1+a_{02}*D_2+a_{03}*D_3=P_0 \quad \text{Equation 1}$$

where $a_{00}$, $a_{01}$, $a_{02}$ and $a_{03}$ are constants.

$$a_{10}*D_0+a_{11}*D_1+a_{12}*D_2+a_{13}*D_3=P_1 \quad \text{Equation 2}$$

where $a_{10}$, $a_{11}$, $a_{12}$ and $a_{13}$ are constants.

Failed data is recovered by transferring the available relevant packets of data and parity to the nodes 2 and 3 hosting the spare containers. The receiving nodes 2 and 3 substitute the received data and parity pieces of the group to solve Equations 1 and 2. This process involves various resources such as network, memory and CPU. Typically, the containers are part of multiple groups. An expansive recovery operation in such a case may exhaust system resources (e.g., CPU, memory and network bandwidth) and effectively block regular I/O and lead to starvation of other tasks. Allocating resources and controlling such a recovery operation is a challenge. As indicated above, utilizing the sliding window protocol will allow such an expansive operation to:

Use system resources such that there is no or minimal effect on regular operations such as I/O.

Provide a mechanism to report the distributed operation's progress.

Handle failures and allow continuation of the operation.

FIG. 4 is a block diagram illustrating a distributed data recovery operation using a sliding window protocol in accordance with an embodiment of the disclosure. As in the case of FIG. 3 described above, in FIG. 4, $D_0$-$D_3$, $P_0$, $P_1$, $S_0$ and $S_1$ that belong to a first data set or group are shown as shaded boxes and are in bold, and $D_0$-$D_3$, $P_0$, $P_1$, $S_0$ and $S_1$ that belong to a second data set or group are shown as unshaded boxes and are not in bold. In the example of FIG. 4, blocks $D_3$ of each data set or group are affected due to failure of container 104D of node 1. Data transfers take place among the 4 nodes 0-3 in order to recover lost blocks/packets $D_3$ of each group. For simplicity, in the example of FIG. 4, node 3 is depicted as an only receiver of data packets/chunks/blocks from its peer nodes 0-2, which contribute to the distributed recovery operation.

As noted above, every node 102 may maintain a proxy data structure (not shown in FIG. 4 in the interest of simplification) corresponding to every other node 102. Further, as indicated above, the proxy data structure may be used to maintain the SSW and RSW information, and for additional purposes (e.g., for data caching). Each of sender nodes 0-2 prepares to send its available block(s) of data and updates its SSW. Receiver node 3 determines its available bandwidth, and updates sender nodes 0-2 regarding the determined available bandwidth. Then, the sender nodes 0-2 send their respective blocks of data that fall into the RSW.

Accordingly, in first data transfer stage 400, receiver node 3 is ready to receive $D_0$, $D_1$, $D_2$ and $P_0$ of the first group and, with the help of the SSW and RSW, sender node 0 transfers $D_0$ and $D_2$ of the first group to receiver node 3, sender node 1 transfers $D_1$ of the first group to receiver node 3, and sender node 2 transfers $P_0$ of the first group to node 3. Upon receiving the blocks $D_0$, $D_1$, $D_2$ and $P_0$ of the first group from the nodes 0-2, node 3 recovers $D_3$ of the first group on $S_0$ of the first group by solving Equations 1 and 2 included above. This is shown on the right side of second a second data transfer stage 402 in FIG. 4.

Additionally, in the second data transfer stage 402, receiver node 3 is ready to receive $D_0$, $D_1$, $D_2$ and $P_1$ of the second group and, with the help of the SSW and RSW, sender node 0 transfers $D_1$ and $D_2$ of the second group to receiver node 3, sender node 1 transfers $D_0$ of the second group to receiver node 3, and sender node 2 transfers $P_1$ of the second group to node 3. Upon receiving the blocks $D_0$, $D_1$, $D_2$ and $P_1$ of the second group from the nodes 0-2, node 3 recovers $D_3$ of the second group on $S_0$ of the second group by solving Equations 1 and 2 included above. This is shown on the right side of a third data transfer stage 404 in FIG. 4, and results in the completion of the data recovery operation.

Advantages of the above-described sliding window protocol include:
  Starvation prevention: The protocol helps ensure that regular operations do not starve during data recovery by automatically adapting to the available resource bandwidths.
  Flow control: Controlling traffic flow through the sliding window restricts senders from flooding receivers and incidentally overloading them.
  Increased resource utilization: Automatically adapting to available resource bandwidths helps increase resource utilization in the absence of other higher priority tasks.

As indicated above in the description of FIG. 2, a sender node can prepare its contribution of the data set against the requested data by the receiver node as per its available bandwidth, but waits until notified by the receiver node to send the data contribution. The sender checks with its copy of the RSW and decides to add its contribution to the RSW or to the SSW, respectively, or even discards the contribution in some cases. Specifically, the following actions may be taken:
  If $D_i < RSW_{lo}$, where $D_i$ is the sender's contribution and it is in the past of the RSW, in this case the receiver does not expect this contribution and the sender can discard the same.
  If $RSW_{lo} < D_i < RSW_{hi}$, then the sender can add its contribution ($D_i$) to the RSW.
  If $D_i > RSW_{hi}$, then the sender's contribution ($D_i$) is in the future, and the sender adds $D_i$ to its SSW.

Reporting progress of a distributed operation can be challenging, especially in case of an expansive system where the data is divided in groups spanning multiple nodes as depicted above. The sliding window protocol provides a progress-reporting mechanism that utilizes RSW edges (e.g., $RSW_{lo}$ and $RSW_{hi}$ values). Progress reporting for a data group, $G_i$, may be as follows:
  If $G_i < RSW_{lo}$, then all the data belonging to group $G_i$ has been processed.
  If $G_i > RSW_{hi}$, then none of the group's data has been processed yet.
  If $RSW_{lo} < G_i > RSW_{hi}$, then the data from data group $G_i$ is being processed.

Such information may be useful in case the group's data is being read or modified concurrently during the distributed data operation.

In some embodiments, the sliding window protocol may be adapted for different failure handling situations. Such situations may include a restart of a failed node, data missing from containers in nodes, and other node operational failure.

In the case of a restart of a failed node, by persisting sliding window edges (e.g., $RSW_{[lo, hi]}$), the node may continue its contribution towards data processing after the restart. There is a possibility that the other nodes can continue the data processing with respect to the distributed data operation where $RSW_{hi}$ may move ahead while $RSW_{lo}$ may not change for a while. Consider the following 2 cases:
  Case N<D (where N is the number of nodes, and D is a number of data units distributed across those N nodes): In this case, all the N nodes participate in the data processing operation and a node failure may halt the operation until the failed node is started.
  Case N>D: In this case, all the N nodes need not take part in the data processing operation of all the G groups requested by the receiver(s). In such a case, the data processing operation can still continue where the $RSW_{hi}$ moves ahead while $RSW_{lo}$ does not as the receiver expects a contribution of a group $G_i$ from the failed node.

As noted above, the sliding window protocol may also be adapted for situations involving missing data. For example, it is possible that not all the data containers spanned by a group contain data corresponding to a particular group. Such a situation may arise in case the group is sparsely populated. This may require special handling because, even though the receiver node is aware of the group's layout of data containers, it may not know whether the corresponding data container holds the data or not. Corresponding senders may not have the presence of the group at all in some such cases. This may cause the receiver to wait endlessly as a worst case scenario. In embodiments of the disclosure, such a situation may be handled by using a SSW described above. Here, if $RSW_{lo} < SSW_{lo}$, it effectively means that the sender node is in the past of the receiver node's lower edge and will not be sending the corresponding data. The sender node communicates its window to the receiver node, and the latter updates its sliding window accordingly, and ceases to wait.

As noted above, in embodiments of the disclosure, the sliding window protocol also supports automatic handling of operational failures occurring on participating nodes. Sender or receiver nodes report errors (e.g., read failure due to invalid or missing data) which are cached as part of the proxy mechanism. This helps the node to take relevant action such as releasing the corresponding resources, and marking the operation as failed or even continuing with it.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of controlling communication among a plurality of nodes in a network, the method comprising:
    providing a data storage device in each node of the plurality of nodes in the network;
    distributing different portions of a data group across multiple nodes of the plurality of nodes such that the data storage device of each different node of the multiple nodes comprises a different portion of the data group stored therein;
    establishing a sender sliding window (SSW) to control sending of the portion of the data group from the data storage device of at least one node of the plurality of nodes to at least one other node of the plurality of nodes;
    storing the portion of the data group from the data storage device of the at least one node of the plurality of nodes in a cache memory of the at least one node of the plurality of nodes, wherein the portion of the data group in the cache memory is a data contribution of the at least one node of the plurality of nodes to the SSW;
    establishing a receiver sliding window (RSW) to control receiving of the portion of the data group from the data storage device of the at least one node of the plurality of nodes at the at least one other node of the plurality of nodes, wherein the RSW comprises:
        a low edge that identifies a beginning packet of an expected data set that the at least one other node is expecting to receive; and
        a high edge that identifies an ending data packet of the expected data set that the at least one other node is expecting to receive, and
        wherein the at least one node of the plurality of nodes stores the low edge and the high edge of the RSW; and
    providing a sliding window protocol that enables at least one of the SSW or the RSW to be sharable among the plurality of nodes such that at least two portions of the data group from the data storage devices of at least two different nodes of the plurality of nodes are transferrable using the SSW or the RSW from the at least two different nodes to another node of the plurality of nodes.

2. The method of claim 1, further comprising enabling the at least one node of the plurality of nodes to send the portion of the data group stored in the data storage device of the at least one node of the plurality of nodes to the at least one other node of the plurality of nodes via the SSW.

3. The method of claim 1, and further comprising transferring, by the at least one node of the plurality of nodes, the data contribution to the RSW in response to receiving a bandwidth availability notification form the at least one other node of the plurality of nodes.

4. The method of claim 1, further comprising discarding, by the at least one node of the plurality of nodes, any data packets in the data contribution that have identifiers that are lower than the low edge of the RSW.

5. The method of claim 1, further comprising sending, by the at least one node of the plurality of nodes, any data packets in the data contribution that have identifiers that are between the low and high edges of the RSW to the at least one other node of the plurality of nodes.

6. The method of claim 1, further comprising retaining, in the at least one node of the plurality of nodes, any data packets in the data contribution that have identifiers that are higher than the high edge of the RSW.

7. A system comprising:
    a plurality of nodes configured to communicate among one another, wherein each of the plurality of nodes comprises at least one data storage container, wherein the at least one data storage container of each different node of the plurality of nodes is configured to store a different portion of a data group;
    a sender sliding window (SSW) configured to control sending of data from at least one node of the plurality of nodes to at least one other node of the plurality of nodes, wherein the at least one node of the plurality of nodes comprises a cache memory that is configured to store the portion of the data group from the data storage device of the at least one node of the plurality of nodes, which is a data contribution of the at least one node of the plurality of nodes to the SSW; and
    a receiver sliding window (RSW) configured to control receiving of the data from the at least one node of the plurality of nodes at the at least one other node of the plurality of nodes, wherein the RSW comprises:
        a low edge that identifies a beginning packet of an expected data set that the at least one other node is expecting to receive; and
        a high edge that identifies an ending data packet of the expected data set that the at least one other node is expecting to receive, and
        wherein the at least one node of the plurality of nodes is configured to store the low edge and the high edge of the RSW; and a sliding window protocol that enables at least one of the SSW or the RSW to be sharable among the plurality of nodes such that, when different portions of a data group are distributed across multiple nodes of the plurality of nodes such that the data storage container of each different node of the multiple nodes comprises a different portion of the data group stored therein, at least two portions of the data group from the data storage containers of at least two different nodes of the plurality of nodes are transferrable using the SSW or the RSW from the at least two different nodes to another node of the plurality of nodes.

8. The system of claim 7, wherein the at least one node of the plurality of nodes is configured to send the portion of the data group stored in the data storage device of the at least one node of the plurality of nodes to the at least one other node of the plurality of nodes via the SSW.

9. The system of claim 7, wherein the at least one node of the plurality of nodes is configured to transfer the data contribution to the RSW in response to receiving a bandwidth availability notification form the at least one other node of the plurality of nodes.

10. The system of claim 7, wherein the at least one node of the plurality of nodes is further configured to discard any data packets in the data contribution that have identifiers that are lower than the low edge of the RSW.

11. The system of claim 7, wherein the at least one node of the plurality of nodes is further configured to send any data packets in the data contribution that have identifiers that are between the low and high edges of the RSW to the at least one other node of the plurality of nodes.

12. The system of claim 7, wherein the at least one node of the plurality of nodes is further configured to retain any data packets in the data contribution that have identifiers that are higher than the high edge of the RSW.

13. A non-transitory computer-readable storage medium including instructions that cause a system including a plurality of nodes in which each different node comprises a data storage device to:

distribute different portions of a data group across multiple nodes of the plurality of nodes such that the data storage device of each different node of the multiple nodes comprises a different portion of the data group stored therein;

establish a sender sliding window (SSW) to control sending of data from at least one node of the plurality of nodes to at least one other node of the plurality of nodes;

store the portion of the data group from the data storage device of the at least one node of the plurality of nodes in a cache memory of the at least one node of the plurality of nodes, wherein the portion of the data group in the cache memory is a data contribution of the at least one node of the plurality of nodes to the SSW; and establish a receiver sliding window (RSW) to control receiving of the data from the at least one node of the plurality of nodes at the at least one other node of the plurality of nodes, wherein the RSW comprises:
a low edge that identifies a beginning packet of an expected data set that the at least one other node is expecting to receive; and
a high edge that identifies an ending data packet of the expected data set that the at least one other node is expecting to receive, and
wherein the at least one node of the plurality of nodes is configured to store the low edge and the high edge of the RSW; and
provide a sliding window protocol that enables at least one of the SSW or the RSW to be sharable among the plurality of nodes such that at least two portions of the data group from the data storage devices of at least two different nodes of the plurality of nodes are transferrable using the SSW or the RSW from the at least two different nodes to another node of the plurality of nodes.

14. The non-transitory computer-readable storage medium of claim 13, wherein the instructions further cause the system to enable the portion of the data group stored in the data storage device of the at least one node of the plurality of nodes to be sent from the at least one node of the plurality of nodes to the at least one other node of the plurality of nodes via the SSW.

15. The non-transitory computer-readable storage medium of claim 13, wherein the instructions further cause the system to transfer the data contribution from the cache memory to the RSW in response to the at least one node of the plurality of nodes receiving a bandwidth availability notification form the at least one other node of the plurality of nodes.

* * * * *

UNITED STATES PATENT AND TRADEMARK OFFICE
CERTIFICATE OF CORRECTION

| | | |
|---|---|---|
| PATENT NO. | : 11,743,193 B2 | Page 1 of 1 |
| APPLICATION NO. | : 17/515989 | |
| DATED | : August 29, 2023 | |
| INVENTOR(S) | : Nikita Danilov et al. | |

It is certified that error appears in the above-identified patent and that said Letters Patent is hereby corrected as shown below:

In the Claims

Column 10, Claim 3, Line 23, please replace the word "form" with the word --from--.

Column 11, Claim 9, Line 21, please replace the word "form" with the word --from--.

Column 12, Claim 15, Line 44, please replace the word "form" with the word --from--.

Signed and Sealed this
Second Day of July, 2024

Katherine Kelly Vidal
*Director of the United States Patent and Trademark Office*